United States Patent
Alapuranen

(10) Patent No.: US 7,697,414 B2
(45) Date of Patent: Apr. 13, 2010

(54) SYSTEM AND METHOD FOR ACHIEVING CREST FACTOR REDUCTION FOR MULTI-CARRIER MODULATION IN A WIRELESS COMMUNICATION NETWORK

(75) Inventor: Pertti O. Alapuranen, Deltona, FL (US)

(73) Assignee: MeshNetworks, Inc., Maitland, FL (US)

( * ) Notice: Subject to any disclaimer, the term of this patent is extended or adjusted under 35 U.S.C. 154(b) by 1019 days.

(21) Appl. No.: 11/240,849

(22) Filed: Sep. 30, 2005

(65) Prior Publication Data

US 2007/0076588 A1    Apr. 5, 2007

(51) Int. Cl.
*H04J 11/00*    (2006.01)
(52) U.S. Cl. .................................................. 370/210
(58) Field of Classification Search ............... None
See application file for complete search history.

(56) References Cited

U.S. PATENT DOCUMENTS

| | | | |
|---|---|---|---|
| 6,125,103 A * | 9/2000 | Bauml et al. ................. | 370/203 |
| 6,445,747 B1 * | 9/2002 | Jafarkhani et al. ........... | 375/285 |
| 6,741,661 B2 | 5/2004 | Wheatley et al. | |
| 6,807,146 B1 | 10/2004 | McFarland | |
| 6,807,165 B2 | 10/2004 | Belcea | |
| 6,873,839 B2 | 3/2005 | Stanforth | |
| 6,920,184 B1 * | 7/2005 | Schouhamer Immink ... | 375/295 |
| 7,023,930 B2 * | 4/2006 | Clausen ....................... | 375/260 |
| 7,072,650 B2 | 7/2006 | Stanforth | |
| 7,583,738 B2 * | 9/2009 | Yun et al. .................... | 375/260 |
| 2001/0022777 A1 | 9/2001 | Bourget et al. | |
| 2004/0062193 A1 | 4/2004 | Ma et al. | |
| 2004/0114504 A1 | 6/2004 | Jung et al. | |
| 2004/0136315 A1 * | 7/2004 | Chang ......................... | 370/206 |
| 2004/0252777 A1 | 12/2004 | Suh et al. | |
| 2005/0008094 A1 * | 1/2005 | Kramer et al. ............... | 375/296 |
| 2005/0157812 A1 | 7/2005 | Liu et al. | |
| 2006/0250936 A1 * | 11/2006 | Chen et al. ................... | 370/208 |
| 2006/0262870 A1 * | 11/2006 | Khan ........................... | 375/260 |
| 2006/0274868 A1 * | 12/2006 | Chen et al. ................... | 375/347 |
| 2008/0008084 A1 * | 1/2008 | Son ............................... | 370/208 |
| 2008/0186843 A1 * | 8/2008 | Ma et al. ...................... | 370/210 |

FOREIGN PATENT DOCUMENTS

WO         0228041 A2      4/2002
WO      2004054193 A2      6/2004

OTHER PUBLICATIONS

Jayalath, A.D.S. & Tellambura, C., "Use of Data Permutation to Reduce the Peak-to-average Power Ratio of an OFDM Signal", Wireless Communications and Mobile Computing, 2002, pp. 187-203.
PCT/US06/35455, PCT Search Report, mailed May 18, 2007—8 pages.

* cited by examiner

*Primary Examiner*—Anh-Vu Ly
(74) *Attorney, Agent, or Firm*—Randi L. Karpinia

(57) ABSTRACT

A system and method for achieving crest factor (CF) reduction for multi-carrier modulation in a wireless communication network (100), such as an ad-hoc peer-to-peer multi-hopping mobile wireless communication network (100). The system and method use the properties of the Inverse Fourier Transform (TFT) for achieving crest-factor reduction. Specifically, the system and method map original signal input frequencies to a new set of frequencies by mapping every input frequency to some other input frequency, and then using the IFT to create multiple versions of the transmitted signal and then computing the transform with the lowest CF and selecting that signal for transmission.

20 Claims, 3 Drawing Sheets

US 7,697,414 B2

1

SYSTEM AND METHOD FOR ACHIEVING CREST FACTOR REDUCTION FOR MULTI-CARRIER MODULATION IN A WIRELESS COMMUNICATION NETWORK

FIELD OF THE INVENTION

The present invention relates to a system and method for achieving crest factor reduction for multi-carrier modulation in a wireless communication network, such as an ad-hoc peer-to-peer multi-hopping mobile wireless communication network, using the properties of the Inverse Fourier Transform.

BACKGROUND

In recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks," issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel," issued on Oct. 19, 2004, and in U.S. Pat. No. 6,873,839 entitled "Prioritized-Routing for an Ad-Hoc, Peer-to-Peer, Mobile Radio Access System," the entire content of each being incorporated herein by reference.

As can be appreciated by one skilled in the art, radio frequency (RF) power amplifiers are used in wireless communication networks for the transmission of signals. Solid state RF power amplifiers can be modeled by amplitude-modulation/amplitude-modulation (AM/AM) characteristics, because the amplitude-modulation/phase-modulation (AM/PM) characteristics are negligible. As the input signal amplitude to amplifier is increased, the output signal will begin to saturate at some level in the RF amplifier. The amplitude where the output signal moves from the linear region to the saturation region is usually referred to as the one decibel (1 dB) compression point of the amplifier.

Different models for RF power amplifiers have been developed, and an important feature of each of these models is the manner in which the output signal moves from the linear region to the saturation region. At the extreme end of the model amplifiers are the completely linear model and limiter model. To maintain linear operation, power amplifiers are usually backed off by some number of dBs from the one decibel (1 dB) compression point. The required back-off

2 depends on the crest factor (CF) of the input signal. For orthogonal frequency division multiplexing (OFDM) modulation, back-offs higher than 5 dB are generally used. Typical back-off numbers are in the region of 9-12 dB for 64 OFDM.

As understood in the art, the crest factor (CF) of a signal can be defined as the peak to average amplitude ratio. The peak to average power ratio (PAPR) can be computed from the CF. High CF multi-carrier modulation, such as OFDM, can pose problems for RF power amplifiers because they require high linearity. To maintain linearity, power amplifiers are usually backed-off from their 1 dB compression point so that they can reproduce the high peak powers of the signal without distortion.

The high CF of OFDM results from the individual carrier components being added together at different phases in the Inverse Fast Fourier Transform (IFFT). The CF is relatively independent of the modulation method of the individual carriers when there are many sub carriers. The CF is also relatively independent of the number of sub carriers for practical 32-256 sub carrier OFDM modulations.

If the CF of the signal can be reduced prior to the RF power amplifier, the back-off can be reduced and mean output power can be increased. Numerous CF reduction methods have been developed. Generally, these include selective mapping where multiple information equivalent signals are created and the lowest CF signal is then selected for transmission. Partial transmit signal is a similar approach where multiple partial signals are generated and the most beneficial linear combination is transmitted. In addition, hard and soft clipping methods limit CF by removing or reducing peaks.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
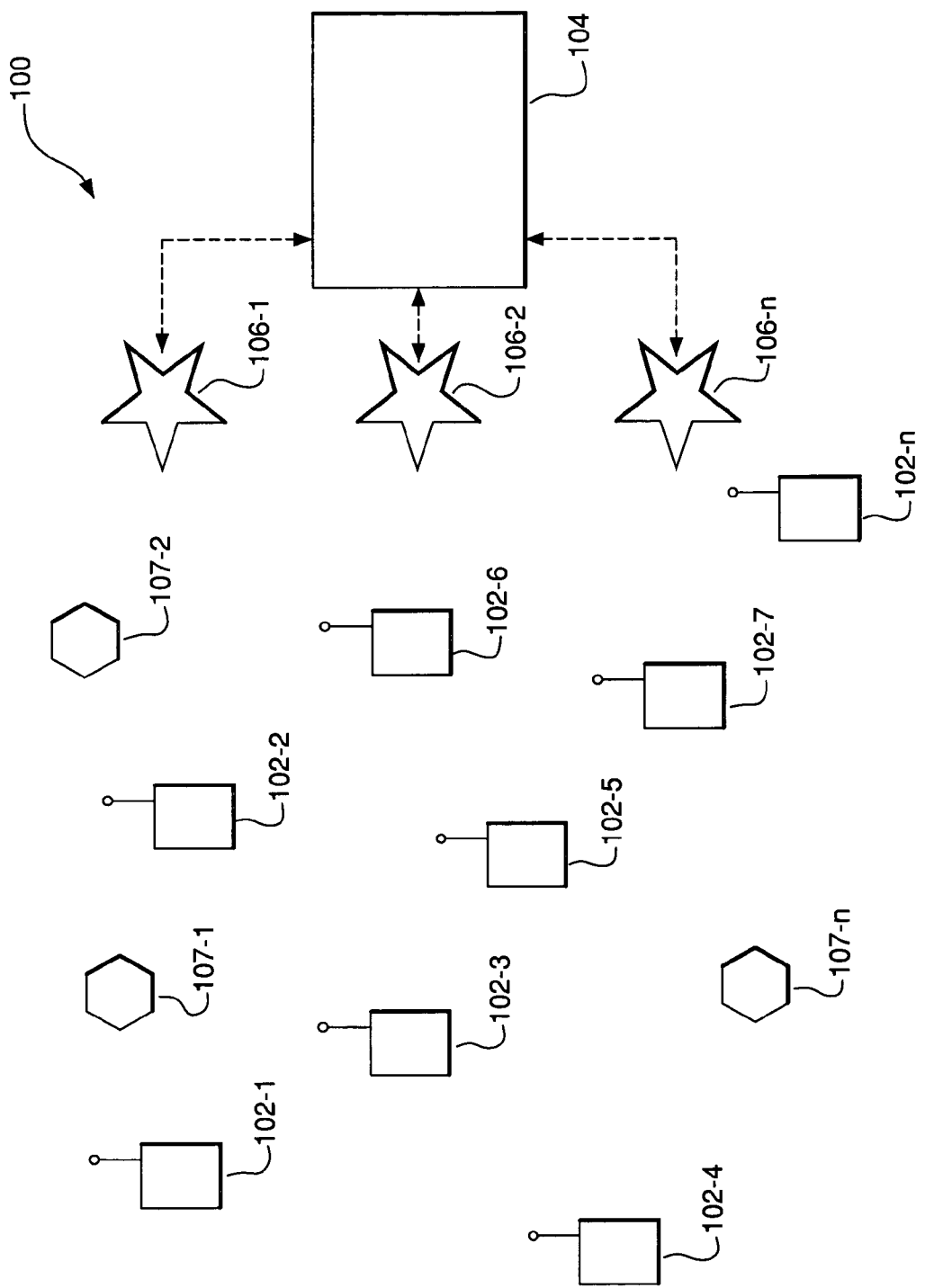
FIG. 1 is a block diagram of an example ad-hoc wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for achieving crest factor reduction for multi-carrier modulation in a wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for achieving crest factor reduction for multi-carrier modulation in a wireless communication network described herein. The non-processor circuits may include, but are not limited to, a radio receiver, a radio transmitter, signal drivers, clock circuits, power source circuits, and user input devices. As such, these functions may be interpreted as steps of a method for achieving crest factor reduction for multi-carrier modulation in a wireless communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As will now be described, the present invention provides a system and method that can achieve crest factor reduction without requiring windowing, multiple partial transmitted signals, clipping in a soft or hard manner, nor the application of multiplicative signals or kernels to phase shift the sub carrier components.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 7,072,650, 6,807,165 and 6,873,839, referenced above.

Figure 2:
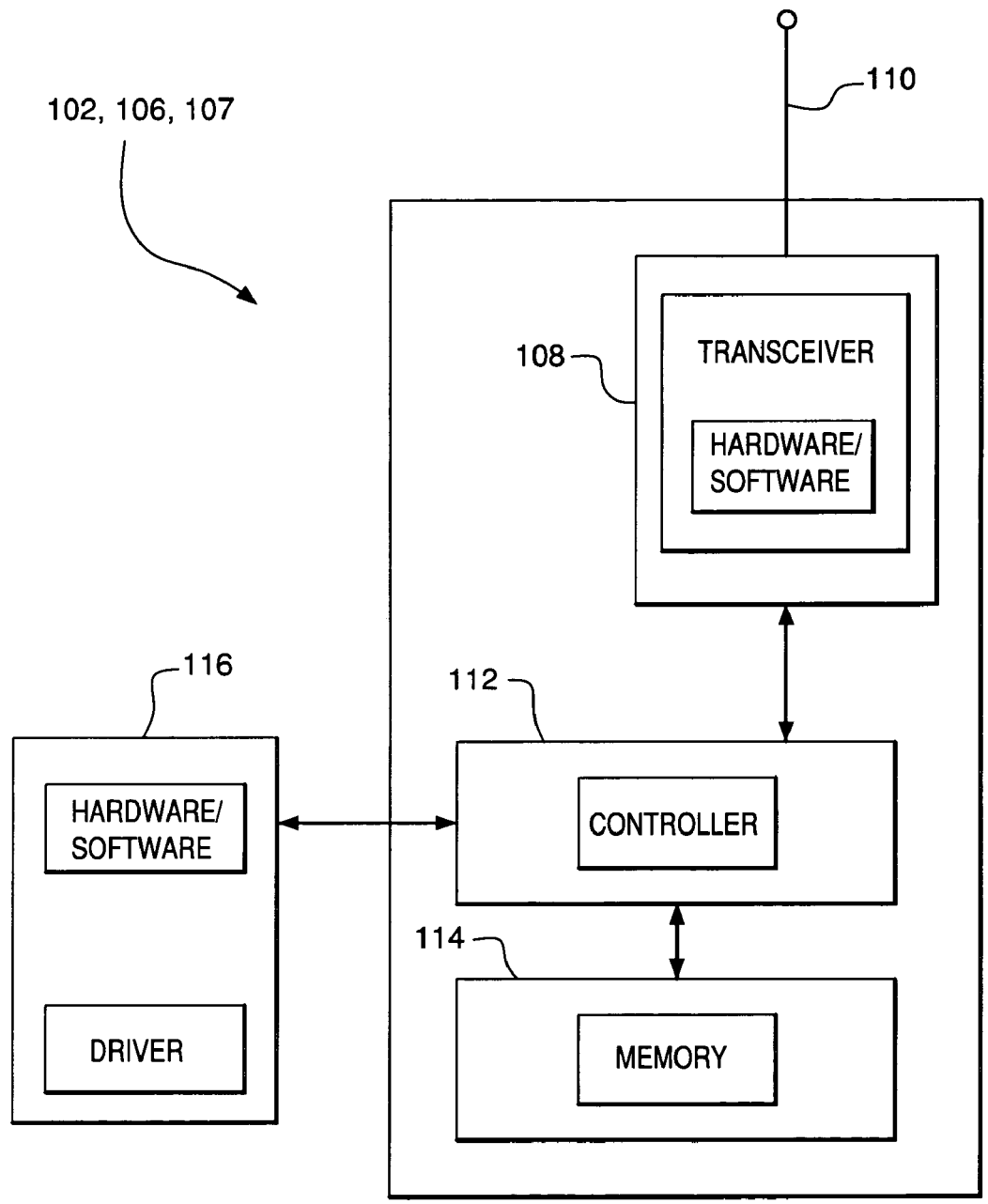
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The transceiver 108 is capable of performing OFDM. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As will now be described, the embodiments of the present invention described herein provide a system and method that is capable of using the beneficial properties of the Inverse Discrete Fourier Transform (IDFT) to achieve crest factor reduction for multi-carrier modulation in a wireless communication network, such as an ad-hoc peer-to-peer multi-hopping mobile wireless communication network. The controller 112 in cooperation with the memory 114 and transceiver 108 of any of the nodes as shown in FIG. 2 can operate to perform the IDFT and mapping as described in more detail below. As can be appreciated by one skilled in the art, the sequence f(n) can be calculated from F(k) using the IDFT, with N being the length of the sequence:

$$f(n) = \frac{1}{\sqrt{N}} \sum_{k=0}^{N-1} F(k) e^{+j2\pi nk/N}$$

For each output sample of the sequence f(n), k input frequencies are added together and multiplied by phase components that contain the output sample index n as a linear component.

By changing the position of input frequency F(k) (i.e. changing k for a frequency component), the phase component used by the IDFT for transforming this frequency to a time domain signal also changes.

Therefore, if the original input frequencies are mapped to a new set of frequencies by mapping every input frequency to some other input frequency, the IDFT will create a new output sequence. By creating multiple mappings, different versions of the same input signal can be generated by IDFT. Hence, this technique does not require the application of multiplicative kernels or phase rotations as it uses the properties of IDFT.

Figure 3:
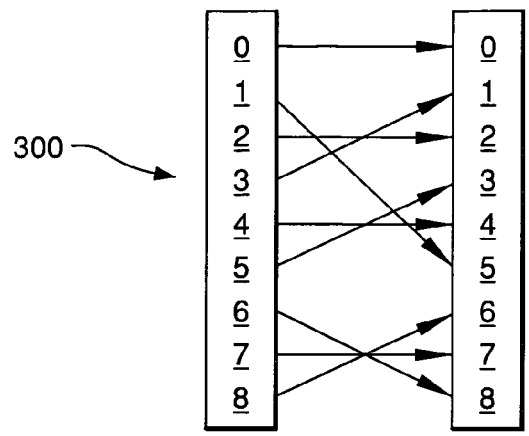
FIG. 3 is a block diagram illustrating an example of a map where each input frequency is mapped to another input frequency in accordance with an embodiment of the present invention.

The CF reduction system and method further uses these properties by generating a map 300 having L maps where each input frequency is mapped to another input frequency as shown in FIG. 3. In this map 300, frequency 0 is mapped to frequency 0, frequency 1 is mapped to frequency 5 and so on. Accordingly, each input frequency is mapped to one output frequency. Furthermore, multiple mappings can be created with pseudo-random mappings. That is, predetermined mapping algorithms can be programmed into the memory 114, for example, for access by the controller 112 so that the controller 112 performs the mapping in accordance with these mapping algorithms. Hence, the system and method can perform crest factor reduction by creating multiple pseudo-random mappings that are known to the transmitter and the receiver. Each of the mappings is associated with an index that is communicated in transmission together with the data.

Figure 4:
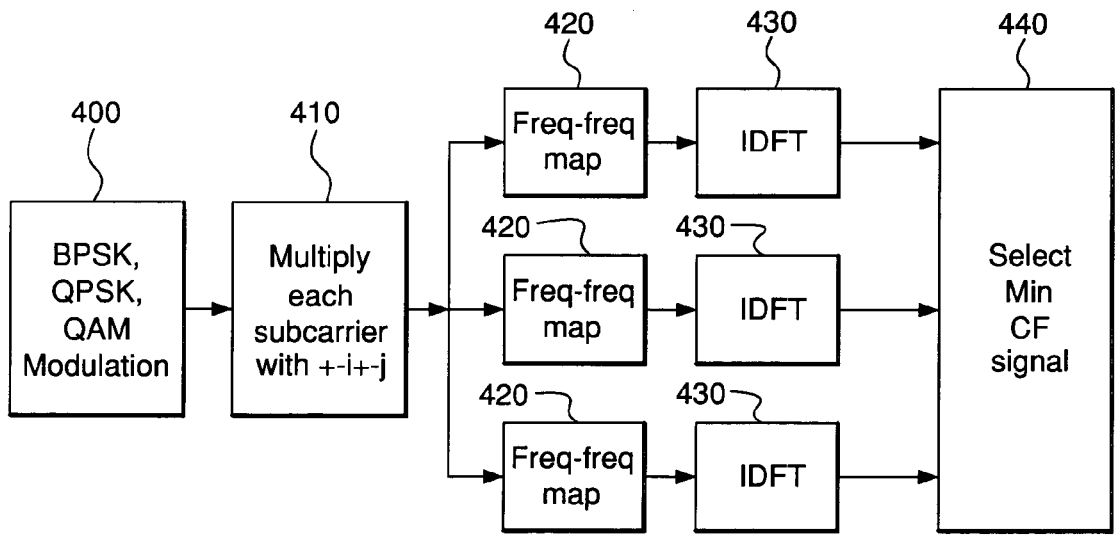
FIG. 4 is a block diagram illustrating an example of the crest factor reduction process utilizing three Inverse Discrete Fourier Transforms (IDFTs) in accordance with an embodiment of the present invention.

FIG. 4 shows a block diagram where the controller 112 operates the transceiver 108 (see FIG. 2) to perform three frequency mappings and 3 IDFTs on the three mappings. The number of IDFTs required depends on many factors including the number of sub carriers, the modulation method and the required crest factor reduction performance, and thus, any suitable number of IDFTs can be performed.

The OFDM modulator 400, which can be located in the transceiver 108 along with the other components shown in FIG. 4, first uses a modulation technique which can be binary phase shift keying (BPSK) modulation, quadrature phase shift keying (QPSK) modulation, quadrature amplitude modulation (QAM) or any suitable modulation technique where each sub carrier modulation has a fixed phase reference that is pseudo random in the sense that the correlation of one sub carrier phase with another sub carrier phase is reduced. This phase reference is ±1±j. However, as can be appreciated by one skilled in the art, this phase reference is not an integral part of the technique, but reduces correlations in cases where all of the sub carriers contain the same data. As further illustrated, a multiplier 410 multiplies each subcarrier of the modulated signal from the OFDM modulator 400 with the phase reference ±1±j. The transmitter (e.g., transceiver 108) then creates multiple versions of the transmitted signal by applying different frequency-to-frequency transforms using maps 420, which can be like the map 300 shown in FIG. 3, and then performing IDFT on each of the mapped signals as indicated in IDFTs 430 to provide transformed signals. The respective output CF value is computed on the transformed signal provided by each IDFT 430. That is, the CF is computed for each of the multiple IDFT outputs according to the following equation:

$$CF = \frac{\max|p[k]|}{\sqrt{\text{mean}(|p[k]|)}},$$

where $0<=k<=N$, N is the number of samples in each IDFT output p[k]. The transform signal with the lowest (i.e., minimum) CF value is selected in selector 440 for transmission.

It is also noted that the number of IDFTs that are evaluated can be reduced by stopping the process when a CF value is computed that is lower than a threshold. The threshold can be variable depending on the success of previous symbols as the average number of evaluations determines the use of resources. The disclosed technique thus uses multiple IDFTs or IFFTs. Some of the input signals are the same for all frequency-to-frequency maps. This feature can be used for optimized IDFT or IFFT by not clocking the logic with unchanged inputs.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for performing multi-carrier modulation communication in a wireless communication network, the method comprising operating by a node within the wireless communication network to:
    map each of a plurality of input frequencies using pseudo-random mapping to another frequency to create a plurality of randomly ordered mapped frequencies;
    perform a mathematical operation on the mapped frequencies to create transformed frequencies;
    determine a respective crest factor (CF) value for each respective transformed frequencies; and
    select for transmission a signal having the transformed frequency that has a reduced crest factor (CF) value that meets a condition.

2. A method as claimed in claim 1, wherein:
    the mapping, mathematical operation and selecting steps are performed by a controller and a transceiver of the node.

3. A method as claimed in claim 1, further comprising:
    applying by the node a phase reference to each of the respective input frequencies before mapping each of the respective input frequencies.

4. A method as claimed in claim 1, wherein:
    the mathematical operation includes a Fourier transform operation.

5. A method as claimed in claim 4, wherein:
    the Fourier transform operation includes one of an Inverse Discrete Fourier Transform (IDFT) operation and an Inverse Fast Fourier Transform (IFFI) operation.

6. A method as claimed in claim 4, wherein:
    the node stops performing the Fourier transform operation on the mapped frequencies when the node determines that a transformed frequency has a CF value that meets the condition.

7. A method as claimed in claim 1, wherein:
    the condition is a value below a predetermined threshold CF value.

8. A method as claimed in claim 7, wherein:
the threshold CF value is variable.

9. A method as claimed in claim 1, further comprising:
modulating by the node each respective signal before performing the mapping step.

10. A method as claimed in claim 1, wherein:
the communication network includes a wireless ad-hoc communication network; and
the method further comprises operating the node to transmit the selected signal in the wireless ad-hoc communication network.

11. A node, operating to perform multi-carrier modulation communication in a wireless communication network, the node comprising:
a frequency mapping device, operating to map each of a plurality of input frequencies using pseudo-random mapping to another frequency to create a plurality of randomly ordered mapped frequencies, to perform a mathematical operation on the mapped frequencies to create transformed frequencies, to determine a respective crest factor (CF) value for each respective transformed frequencies, and to select for transmission a signal having the transformed frequency that has a reduced crest factor (CF) value that meets a condition.

12. A node as claimed in claim 11, wherein:
the frequency mapping device includes a controller, operating to create the mapped frequencies; and
a transceiver, operating to transmit the selected signal.

13. A node as claimed in claim 11, wherein:
the frequency mapping device further operating to apply a phase reference to each of the respective input frequencies before mapping each of the respective input frequencies.

14. A node as claimed in claim 11, wherein:
the mathematical operation includes a Fourier transform operation.

15. A node as claimed in claim 14, wherein:
the Fourier transform operation includes one of an Inverse Discrete Fourier Transform (IDFT) operation and an Inverse Fast Fourier Transform (IFFT) operation.

16. A node as claimed in claim 14, wherein:
the frequency mapping device stops performing the Fourier transform operation on the mapped frequencies when a transformed frequency is identified having the CF value that meets the condition.

17. A node as claimed in claim 11, wherein:
the condition is a value below a predetermined threshold CF value.

18. A node as claimed in claim 17, wherein:
the threshold CF value is variable.

19. A node as claimed in claim 11, wherein:
the frequency mapping device operates to modulate each respective signal before mapping the frequency of each respective signal.

20. A node as claimed in claim 11, wherein:
the communication network includes a wireless ad-hoc communication network, and a transmitter operates to transmit the selected signal in the wireless ad-hoc communication network.

* * * * *

UNITED STATES PATENT AND TRADEMARK OFFICE
CERTIFICATE OF CORRECTION

PATENT NO. : 7,697,414 B2  Page 1 of 1
APPLICATION NO. : 11/240849
DATED : April 13, 2010
INVENTOR(S) : Alapuranen It is certified that error appears in the above-identified patent and that said Letters Patent is hereby corrected as shown below:

Title Page, Item (57), under "ABSTRACT", in Column 2, Line 6, delete "(TFT)" and insert
-- (IFT) --, therefor.

IN THE SPECIFICATION

In Column 5, Line 45, delete "$\pm 1 \pm j$." and insert -- $\pm i \pm j$. --, therefor.

In Column 5, Line 51, delete "$\pm 1 \pm j$." and insert -- $\pm i \pm j$. --, therefor.

IN THE CLAIMS

In Column 6, Line 59, in Claim 5, delete "(IFFI)" and insert -- (IFFT) --, therefor.

Signed and Sealed this
Twelfth Day of June, 2012

David J. Kappos
*Director of the United States Patent and Trademark Office*